US010064176B2

(12) United States Patent
Ma

(10) Patent No.: US 10,064,176 B2
(45) Date of Patent: Aug. 28, 2018

(54) METHOD AND DEVICE FOR COMMUNICATION IN D2D UE OF TDD SYSTEM

(71) Applicant: SHANGHAI LANGBO COMMUNICATION TECHNOLOGY COMPANY LIMITED, Shanghai (CN)

(72) Inventor: Li Ma, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 14/892,922

(22) PCT Filed: Jun. 9, 2014

(86) PCT No.: PCT/CN2014/079474
§ 371 (c)(1),
(2) Date: Nov. 20, 2015

(87) PCT Pub. No.: WO2014/198207
PCT Pub. Date: Dec. 18, 2014

(65) Prior Publication Data
US 2016/0119921 A1  Apr. 28, 2016

(30) Foreign Application Priority Data

Jun. 13, 2013 (CN) .......................... 2013 1 0236734

(51) Int. Cl.
H04W 80/04 (2009.01)
H04W 72/04 (2009.01)
(Continued)

(52) U.S. Cl.
CPC .......... *H04W 72/0446* (2013.01); *H04L 1/00* (2013.01); *H04L 5/14* (2013.01); *H04W 4/70* (2018.02);
(Continued)

(58) Field of Classification Search
CPC ............. H04W 72/0446; H04W 4/005; H04W 72/1263; H04W 72/12; H04W 80/04; H04W 72/04; H04L 5/14
See application file for complete search history.

(56) References Cited

U.S. PATENT DOCUMENTS

2013/0142268 A1* 6/2013 Gao .......................... H04L 5/14
375/252
2014/0003301 A1* 1/2014 Madan ................ H04W 72/042
370/280
(Continued)

FOREIGN PATENT DOCUMENTS

CN   102281099 A   12/2011
CN   102307060 A   1/2012
(Continued)

OTHER PUBLICATIONS

International Search Report dated Sep. 9, 2014 from International Patent Application No. PCT/CN2014/079474 filed Jun. 9, 2014.
(Continued)

*Primary Examiner* — Andrew Lee
(74) *Attorney, Agent, or Firm* — Perkins Coie LLP

(57) ABSTRACT

The disclosure is related to a method and used in a user equipment that supports Device to Device transmission in Time Division Duplex system and a user equipment thereof. In one embodiment, UE receives downlink signaling to obtain a first configured frame structure, or determining a first configured frame structure by itself in step 1, and transmits a first D2D signaling to indicate the first config- (Continued)

ured frame structure in step 2; wherein the first configured frame structure indicates a uplink or downlink direction for all the subframes within one radio frame. The technical solution of the disclosure solves the problem of interference of the downlink signals for the UEs configured with different frame structures in D2D communication in eIMTA scenario.

12 Claims, 6 Drawing Sheets

(51) Int. Cl.
    *H04W 4/70*     (2018.01)
    *H04L 1/00*     (2006.01)
    *H04W 48/00*     (2009.01)
    *H04W 8/00*     (2009.01)
    *H04L 5/14*     (2006.01)
    *H04W 72/12*     (2009.01)
    *H04W 92/18*     (2009.01)

(52) U.S. Cl.
    CPC ........... *H04W 8/005* (2013.01); *H04W 48/00* (2013.01); *H04W 72/1263* (2013.01); *H04W 92/18* (2013.01)

(56) References Cited

U.S. PATENT DOCUMENTS

2014/0269338 A1* 9/2014 Jung ..................... H04L 5/0055 370/241
2014/0321377 A1* 10/2014 Ryu ................... H04W 72/1247 370/329
2014/0334354 A1* 11/2014 Sartori .................. H04W 8/005 370/280
2014/0335853 A1* 11/2014 Sartori ................ H04W 76/023 455/426.1
2014/0341092 A1* 11/2014 Chu ...................... H04L 5/1469 370/280
2015/0043398 A1* 2/2015 Fwu ...................... H04W 36/32 370/280
2015/0078466 A1* 3/2015 Zhou ................... H04W 56/004 375/260
2015/0245192 A1* 8/2015 Wu ....................... H04W 8/005 370/329
2015/0282132 A1* 10/2015 Kim ...................... H04W 8/005 370/329
2016/0156494 A1* 6/2016 Zhao .................... H04B 7/2656 370/476

FOREIGN PATENT DOCUMENTS

CN     103108405 A     5/2013
CN     103139921 A     6/2013

OTHER PUBLICATIONS

International Preliminary Report on Patentability dated Dec. 15, 2015 from International Patent Application No. PCT/CN2014/079474 filed Jun. 9, 2014.

* cited by examiner

METHOD AND DEVICE FOR COMMUNICATION IN D2D UE OF TDD SYSTEM

CROSS-REFERENCE TO RELATED APPLICATION

This application is a U.S. National Phase application under 35 U.S.C. § 371 of International Application No. PCT/CN2014/079474, filed on Jun. 9, 2014, and claims benefit to Chinese Patent Application No. CN 201310236734.5, filed on Jun. 13, 2013, all of which is hereby incorporated by reference for all purposes. The International Application was published in China on Dec. 18, 2014 as WO2014198207 A1 under PCT Article 21 (2).

BACKGROUND

Technical Field

The disclosure is related to a subframe scheduling scheme in the Time Division Duplex (TDD) system, and more particular to a subframe scheduling scheme in the TDD system of the Long Term Evolution (LTE) Device to Device (D2D) configuration.

Related Art

The traditional LTE system of 3rd Generation Partnership Project (3GPP) defines the frame structure of the TDD system, as shown in Table 1, in which D indicates downlink subframe, U indicates uplink subframe, S indicates special subframe.

TABLE 1

TDD LTE frame structure

| TDD UL/DL frame structure | DL-UL switch point period | Subframe Index | | | | | | | | | |
|---|---|---|---|---|---|---|---|---|---|---|---|
| | | 0 | 1 | 2 | 3 | 4 | 5 | 6 | 7 | 8 | 9 |
| #0 | 5 ms | D | S | U | U | U | D | S | U | U | U |
| #1 | 5 ms | D | S | U | U | D | D | S | U | U | D |
| #2 | 5 ms | D | S | U | D | D | D | S | U | D | D |
| #3 | 10 ms | D | S | U | U | U | D | D | D | D | D |
| #4 | 10 ms | D | S | U | U | D | D | D | D | D | D |
| #5 | 10 ms | D | S | U | D | D | D | D | D | D | D |
| #6 | 5 ms | D | S | U | U | U | D | S | U | U | D |

In the traditional 3GPP version, the data communication occurs between the base station and the user equipment (UE). In 3GPP R (Release) 12, D2D communication is approved and discussed. The essential characteristics of D2D is to allow data transfer between the UEs. For FDD and TDD system, 3GPP has concluded that the UE is not allowed for simultaneous receiving and transmitting in D2D system in the RAN1 (Radio Access Network Working Group 1) #73 meeting. Furthermore, for avoiding the interference of the downlink data on D2D communication, the UE occupies the uplink subframe of the subframe (TDD) for D2D communication. The downlink subframe needs further discussion.

The other important issue about TDD system in 3GPP R12 is eIMTA (Enhanced Interference Traffic Adaptation). The frame structure of the traditional TDD system is configured via SIB (System Information Block), and the shortest configuration period is 640 ms (millisecond). eIMTA allows TDD system to adjust the frame structure dynamically (10 millisecond period). RAN1 #73 meeting concluded that the common physical layer signaling is used to dynamically configure the frame structure of the current frame. For 3GPP R12 and the previous LTE system, the optional range of SIB and the fame structure configured by the common physical layer signaling is TDD UL/DL frame structure #{0,1,2,3,4,5,6}.

Therefore, the D2D solution needs to support eIMTA scenario. One typical scenario is that two UEs performing D2D communication are in the coverage of the different service cells (or one is within the coverage of the service cell and the other one is outside the coverage of the service cell). At this point it requires studying how to perform the resource allocation for D2D communication.

SUMMARY

One principle for D2D resource allocation is to pretect the D2D user equipment (UE) from the downlink interference generated by the system equipment. Based on the inventor's research, it is found that in some specific scenarios the two UEs performing D2D communication may experience interference from the different downlink equipments. Two scenarios below are the examples for the two user equipments UE1, UE 2 performing D2D communication.

Scenario I: UE1 and UE 2 are respectively camping on the two service cells with different frame structures.

Scenario II: UE1 is under the service cell's coverage while UE2 is outside the coverage of the service cell (i.e. UE2 is not interfered by the downlink signals).

The disclosure provides a unified solution for the different scenarios.

The disclosure provides a method used in a user equipment that supports Device to Device transmission in Time Division Duplex system. The method comprises receiving a downlink signaling to obtain a first configured frame structure, or determining a first configured frame structure by itself; and transmitting a first D2D signaling to indicate the first configured frame structure.

In one embodiment, the first configured frame structure indicates an uplink or downlink direction for all the subframes within one radio frame.

The step of receiving a downlink signaling to obtain a first configured frame structure is applicable for the user equipment within the network coverage. That is, the user equipment is able to receive the downlink configured frame structure signaling from the service cell. There are two types of the downlink signaling in LTE network, which are System Information Block (SIB) and the common physical layer signaling. The former is suitable for a traditional scenario, and the latter is suitable for eIMTA scenario.

The step of determining a first configured frame structure by itself is applicable for the user equipment outside of the network coverage. That is, the user equipment can not reliably receive the data from the service cell or the user equipment does not search out the accessible cells. Therefore, the user equipment needs to determine the first configured frame structure by itself.

Specifically, according to one aspect of the disclosure, the first D2D signaling is a physical layer signaling.

To support eIMTA, the user equipment in D2D communication needs to dynamically inform the paired user equipment in D2D communication of the status of its frame structure.

Specifically, according to one aspect of the disclosure, when the UE determines the first configured frame structure by itself, the first configured frame structure is configured as uplink frame structure.

For the user equipment outside of the network coverage, it is not interfered by the downlink signals of the service cell. Therefore, all the subframes may be suitable for receiving the D2D signals.

Specifically, according to one aspect of the disclosure, the disclosure further comprises:

receiving a second D2D signaling to obtain a second configured frame structure;

wherein the second configured frame structure indicates a uplink or downlink direction for all the subframes within one radio frame.

In one embodiment, the aforementioned aspects are suitable for D2D communication with the peer configuration. That is each user equipment needs to report its frame structure to the peer user equipment, and in the meanwhile needs to receive a signaling corresponding to the frame structure from the peer user equipment. For D2D communication with the master-slave configuration, the slave UE only needs to report its frame structure to the master UE through signaling without acquiring the frame structure of the master UE.

In the D2D communication, the possible D2D communication resource scheduling (for example physical resource allocation, Hybrid Automatic Repeat Request (HARQ), retransmission resource allocation, power control, etc.) comprises the following approaches:

Approach 1: the system controls all the resource scheduling;

Approach 2: UE controls all the resource scheduling;

Approach 3: the system and UE together control the resource scheduling.

Approach 1 may require the excessive control signaling and may have larger delay. Approach 2 may generate a certain extent of interference on the non-D2D communication in the cell. Approach 3 is a reasonable solution. For example, the system allocates the frequency-domain resources, and the UE determines the time resources for D2D communication by itself. For Approach 2 and Approach 3, the UE is likely to determine the subframes available for D2D reception and D2D transmission. In eIMTA scenario of TDD, it is possible that the two UEs in D2D communication are configured with the different frame structures. Therefore, for a given UE, the available subframes for D2D reception may be different from the available subframes for D2D transmission.

Specifically, according to one aspect of the disclosure, the disclosure further comprises:

receiving the D2D signals in a subframe corresponding to the uplink subframe of the first configured frame structure.

The essence of the above aspect is that the UE can only receive the D2D signals in the uplink subframe of the configured frame structure so as to avoid the downlink interference.

Specifically, according to another aspect of the disclosure, the disclosure further comprises:

selecting a suitable subframe out of the subframes corresponding to the UL subframe of the second configured frame structure; and transmitting the D2D signals on the suitable subframe.

The essence of the above aspect is that (in order to assure that the D2D receiving UE may receive the D2D signals) the UE transmits the D2D signals on the selected (one or more) subframe (s), which is (are) configured as UL subframe (s) for the D2D receiving UE. In one embodiment, the UE selects the suitable subframe(s) by itself. In another embodiment, the UE selects the suitable subframe(s) according to the instruction of the downlink selection signaling.

Specifically, according to one aspect of the disclosure, the UE receives the downlink signaling to obtain the first configured frame structure. The downlink signaling is SIB or a physical layer signaling. The first configured frame structure is one of TDD UL/DL frame structure #{0,1,2,3,4,5,6}.

The disclosure provides a method used in UE that supports D2D transmission under TDD system, comprising:

receiving a first D2D signaling to obtain a first configured frame structure;

wherein the first configured frame structure indicates a uplink or downlink direction for all the subframes within one radio frame.

Specifically, according to one aspect of the disclosure, the method further comprises:

selecting one (or more) suitable subframe (s) corresponding to the UL subframe of the first configured frame structure; and transmitting the D2D signals on the suitable subframe(s).

Specifically, according to one aspect of the disclosure, the first D2D signaling is a physical layer signaling.

Specifically, according to one aspect of the disclosure, the first configured frame structure are configured as UL subframes; or the first configured frame structure is one of TDD UL/DL frame structure #{0,1,2,3,4,5,6}.

The disclosure provides a user equipment (UE) comprising:

a first module for receiving a downlink signaling to obtain a first configured frame structure, or determining a first configured frame structure by itself; and a second module for transmitting a first D2D signaling to indicate the first configured frame structure;

wherein the first configured frame structure indicates a uplink or downlink direction for all the subframes within one radio frame.

The UE comprises, but not limited to mobile phones, tablet computers, data cards, laptops, and etc.

In one embodiment, the UE further comprises a third module for receiving a second D2D signaling to obtain a second configured frame structure; wherein the second configured frame structure indicates a uplink or downlink direction for all the subframes within one radio frame.

In one embodiment, the UE further comprises a fifth module for selecting a suitable subframe(s) out of the subframes corresponding to the UL subframes of the second configured frame structure; and a sixth module for transmitting the D2D signal on the suitable subframe.

In one embodiment, the UE further comprises a fourth module for receiving the D2D signal in one (or more) subframe(s) out of the subframes corresponding to the UL subframe of the first configured frame structure.

The disclosure solves the problem that the UE in D2D communication cannot determine the subframe for D2D signal transmission in eIMTA scenario. Through allowing the UE to transmit the configured frame structure to assure the peer UE being able to determine the subframe(s) for transmitting D2D signal, the disclosure maximumly maintain the compatibility with the existing systems.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
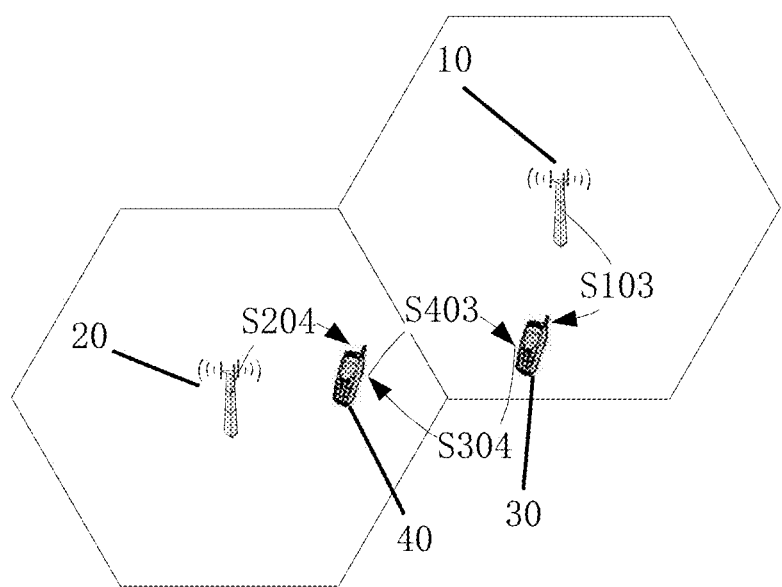
FIG. 1 is a schematic diagram illustrating two UE in D2D communication camping on two different service cells respectively according to one embodiment of the present disclosure.

Embodiment I illustrates two UEs in D2D communication located at two different service cells, as shown in FIG. 1. In FIG. 1, the first UE 30 is in the coverage of the first service cell 10, and the second UE 40 is in the coverage of the second service cell 20. The first UE 30 and the second UE 40 perform D2D communication.

For the first UE 30, in Step S103, the first UE 30 receives the SIB signaling of the first service cell 10 to obtain the configured frame structure of the first cell 10. In Step 304, the D2D signaling is transmitted to the second UE 40 to indicate the configured frame structure of the first cell 10. In Step S403, the D2D signaling from the second UE 40 is received to obtain the configured frame structure of the second cell 20.

For the second UE 40, in Step S204, the common physical layer signaling of the second service cell 20 is received to obtain the configured frame structure of the second service cell 20. In Step 403, the D2D signaling is transmitted to the first UE 30 to indicate the configured frame structure of the second cell 20. In Step 304, the D2D signaling from the first UE 30 is received to obtain configured frame structure of the first cell 10.

In Embodiment I, the configured frame structure is TDD UL/DL frame structure, which is one of TDD UL/DL frame structure #{0,1,2,3,4,5,6}.

Embodiment II

Figure 2:
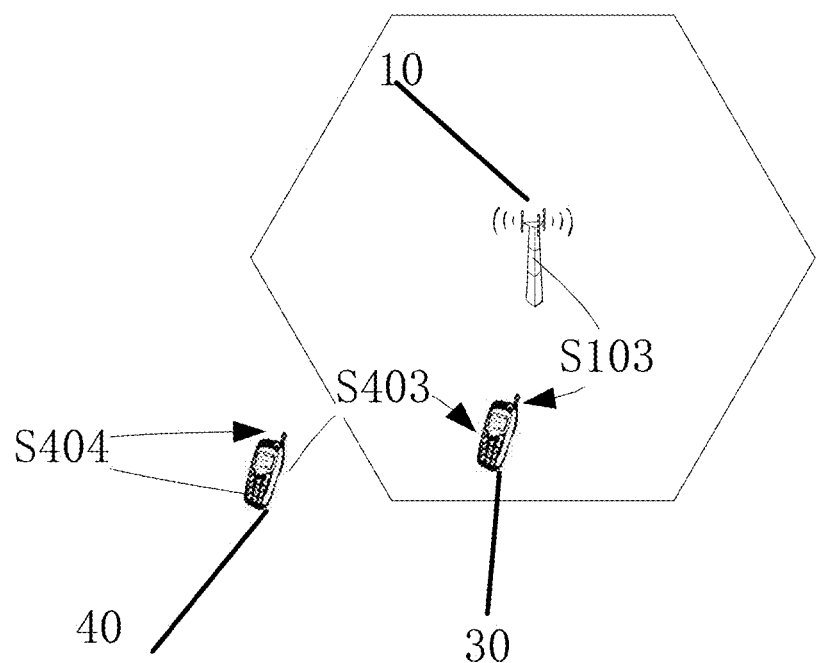
FIG. 2 is a schematic diagram illustrating one UE in D2D communication is in the coverage of the service cell and the other UE in D2D communication is outside the coverage of the service cell according to one embodiment of the present disclosure.

Embodiment II illustrates that one UE in D2D communication is in the coverage of the service cell and the other UE in D2D communication is outside the coverage of the service cell, as shown in FIG. 2. In FIG. 2, the first UE 30 is in the first service cell 10, and the second UE 40 is outside of the service cell. The first UE 30 and the second UE 40 perform D2D communication.

For the first UE 30, in Step S103, the first UE 30 receives the SIB signaling of the first service cell 10 to obtain the configured frame structure of the first cell 10. In Step 403, the signaling from the second UE 40 is received to obtain the configured frame structure of the second UE 40.

For the second UE 40, in Step 404, the frame structure of the second UE 40 is determined as uplink frame structure. The Step 404 is completed in the second UE 40. In Step S403, a signaling is transmitted to the first UE 30 to indicate the configured frame structure of the second UE 40. In Embodiment II, the first UE 30 is master, and the second UE 40 is slave.

Embodiment III

Figure 3:
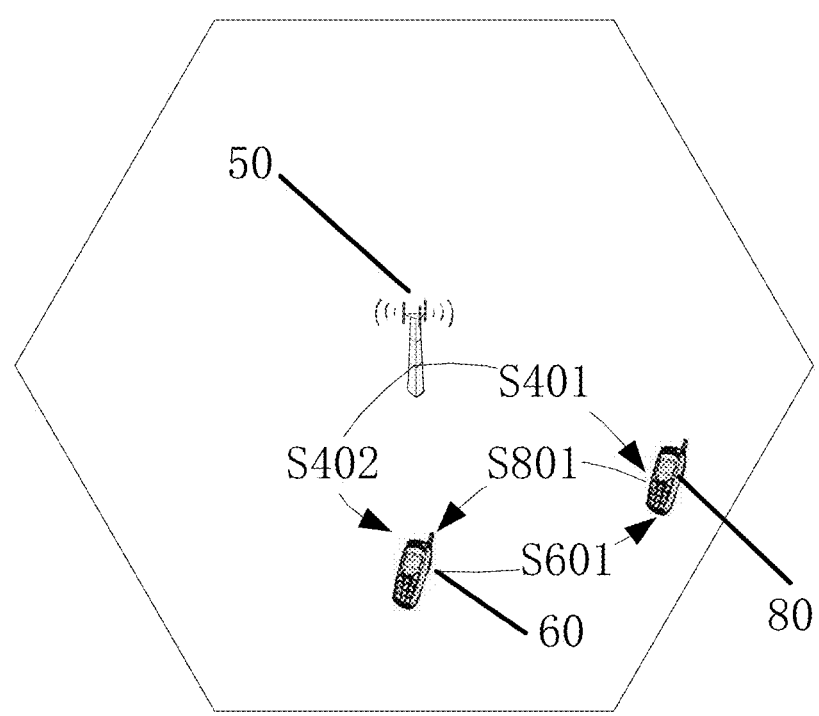
FIG. 3 is a schematic diagram illustrating two UE in D2D communication at the same service cell according to one embodiment of the present disclosure.

Embodiment III illustrates that the two UEs in D2D communication are at the same cell, as shown in FIG. 3. In FIG. 3, the service cell for the third UE 60 and the forth UE 80 is the third service cell 50.

For the forth UE 80, in Step S401, the forth UE 80 receives receives the SIB signaling of the third cell 50 to obtain the configured frame structure of the third cell 50, which is TDD UL/DL frame structure #0. In Step S601, the forth UE 80 receives the D2D signaling from the third UE 60 to obtain the configured frame structure of the third UE 60, which is TDD UL/DL frame structure #4. In Step S801, the forth UE 80 transmits the D2D signaling to indicate the configured frame structure as TDD UL/DL frame structure #0.

For the third UE 60, in Step S402, the third UE 60 receives the downlink common physical layer signaling for eIMTA configured frame structure from the third cell to obtain the current configured frame structure of the third cell 50, which is TDD UL/DL frame structure #4. In Step S601, the third UE 60 transmits the D2D signaling to indicate the configured frame structure as TDD UL/DL frame structure #4. In Step S801, the third UE 60 receives the D2D signaling from the forth UE 80 to obtain the configured frame structure of the forth UE 80, which is TDD UL/DL frame structure #0.

In Embodiment III, the forth UE 80 is a non eIMTA configured UE. The third UE 60 is an eIMTA configured UE. Although they are in the same service cell, the configured frame structures of the forth UE 80 and the third UE 60 are different.

In another embodiment of Embodiment III, the D2D singling is a physical layer signaling.

Embodiment IV

Figure 4:
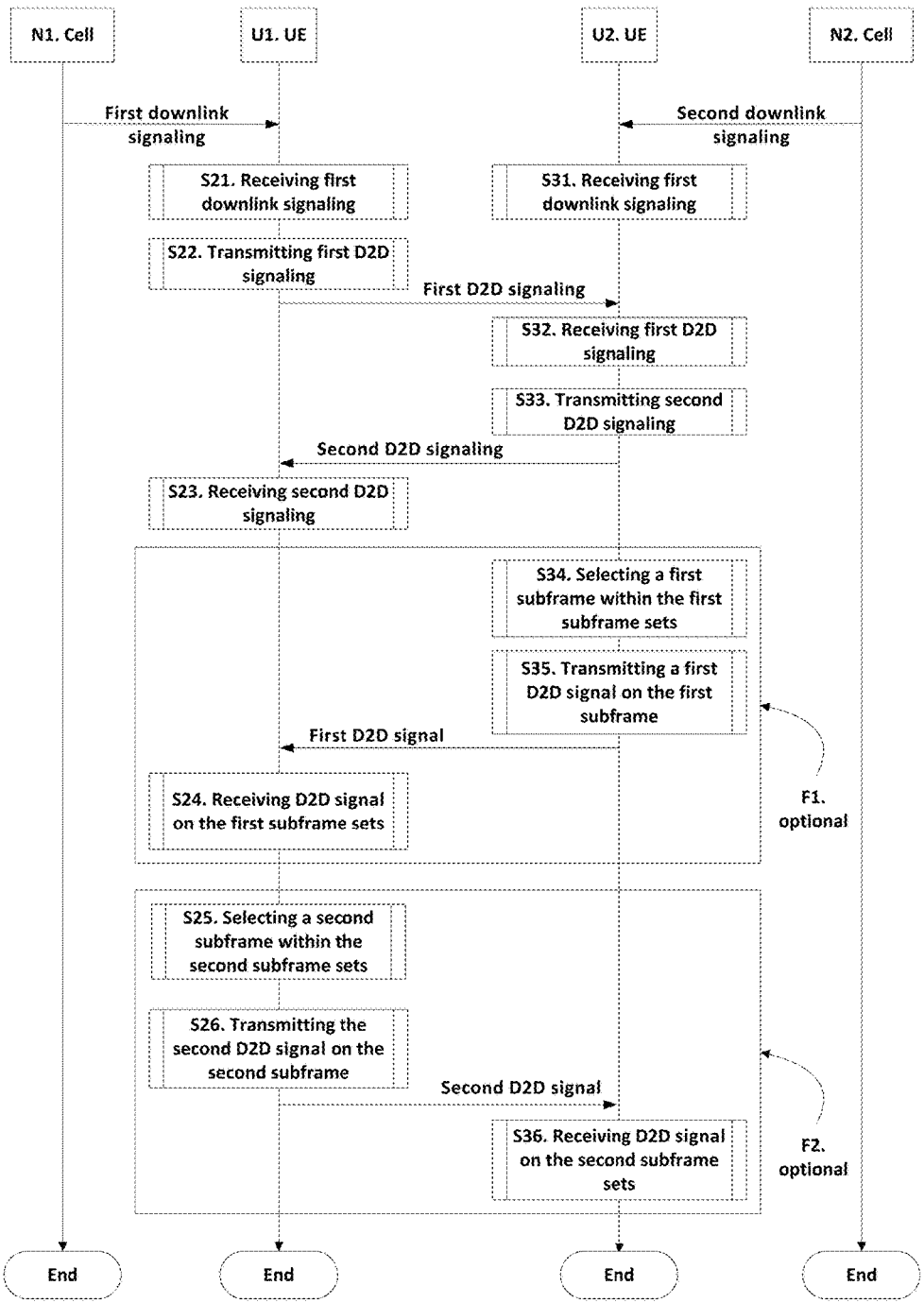
FIG. 4 is a schematic flow chart illustrating the D2D communication according to one embodiment of the present disclosure.

Embodiment IV illustrates the process of D2D communication, as shown in FIG. 4. In FIG. 4, the service cell for UE U1 is N1, and the service cell for UE U2 is N2. U1 and U2 perform D2D communication. In FIG. 4, the steps in the block F1 and the steps in the block F2 are optional.

For U1, in Step S21, U1 receives the first downlink signaling transmitted from N1 to obtain the configured frame structure S1. In Step 22, the first D2D signaling is transmitted to indicate the configured frame structure S1. In Step S23, the second D2D signaling is received to obtain the configured frame structure S2.

For U2, in Step S31, U2 receives the second downlink signaling transmitted from N2 to obtain the configured frame structure S2. In Step S32, the first D2D signaling is received to obtain the configured frame structure S1. In Step S33, the second D2D signaling is transmitted to indicate the configured frame structure S2.

In Embodiment IV, the downlink signaling is SIB. The configured frame structure is one of TDD UL/DL frame structure #{0,1,2,3,4,5,6}.

In an alternative embodiment of Embodiment IV, in Step S34, UE U2 selects a first subframe within the first subframe set (according to the instruction of N2 or by itself). In Step S35, the first D2D signal is transmitted on the first subframe. In Step S24, UE U1 receives the D2D signal on the first subframe.

In the alternative embodiment of Embodiment IV, the first subframe set is a set composed of the subframes of the uplink subframe corresponding to S1.

In an alternative embodiment of Embodiment IV, in Step S25, UE U1 selects a second subframe within the second subframe set (according to the instruction of N1 or by itself). In Step S36, the second D2D signal is transmitted on the second subframe. In Step S36, UE U2 receives the D2D signal on the second subframe.

In the alternative embodiment of Embodiment IV, the second subframe set is a set composed of the subframes of the uplink subframe corresponding to S2.

Embodiment V

Figure 5:
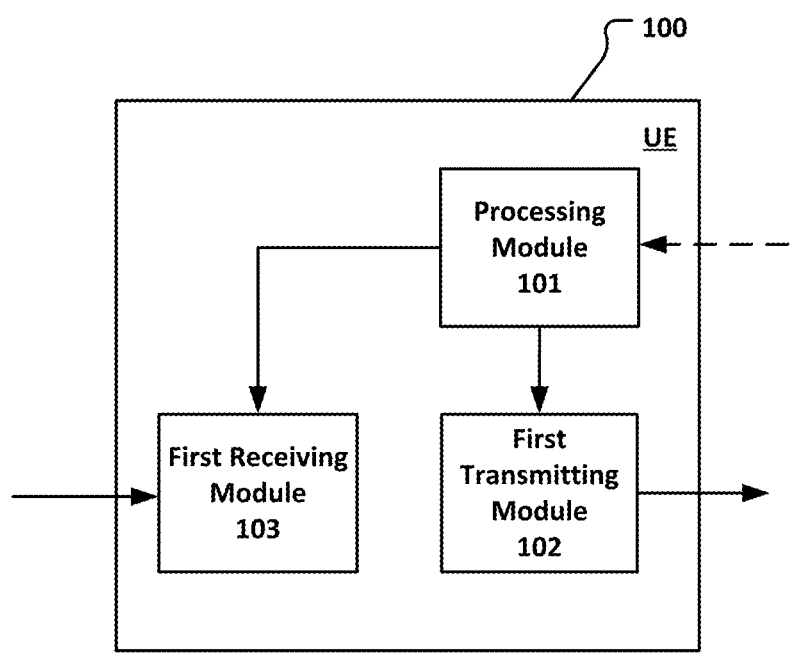
FIG. 5 is a block diagram illustrating the device transmitting the configured frame structure signaling in an user equipment according to one embodiment of the present disclosure.

Embodiment V illustrates a block diagram illustrating the device transmitting the configured frame structure signaling in a user equipment, as shown in FIG. 5. In FIG. 5, the device 100 transmitting the configured frame structure signaling comprises a processing module 101, a first transmitting module 102, and a first receiving module 103. The processing module 101 is for obtaining a first frame structure. For the UE within the coverage of the service cell, the processing module 101 obtains the first frame structure according to the downlink signaling of the service cell. For the UE outside of the coverage of the service cell, the processing module 101 determines the first frame structure as uplink frame structure itself. The first transmitting module 102 transmits the D2D signaling to indicate the first configured frame structure. The first receiving module 103 receives the D2D signal on the subframe of the uplink subframe corresponding to the first frame structure.

In an alternative embodiment, the first frame structure is one of TDD UL/DL frame structure #{0,1,2,3,4,5,6}, which are uplink frame structure.

Embodiment VI

Figure 6:
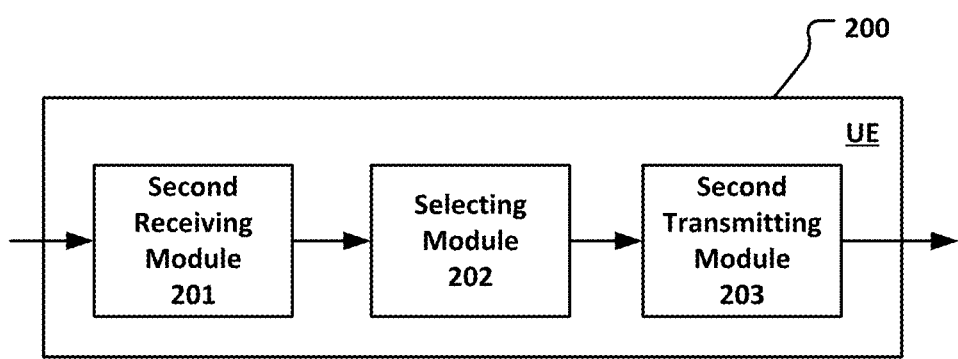
FIG. 6 is a block diagram illustrating the device receiving the configured frame structure signaling in a user equipment according to one embodiment of the present disclosure.

Embodiment VI illustrates a block diagram illustrating the device receiving the configured frame structure signaling in a user equipment, as shown in FIG. 6. In FIG. 6, the device 200 receiving the configured frame structure signaling comprises a second receiving module 201, a selecting module 202 and a second transmitting module 203. The second receiving module 201 receives the D2D signaling to obtain the second frame structure. The selecting module 202 selects a suitable subframe from the subframes of the uplink subframes corresponding the second frame structure. The second transmitting module 203 transmits the D2D signal on the suitable subframe.

In an alternative embodiment, the second frame structure is one of TDD UL/DL frame structure #{0,1,2,3,4,5,6}.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present disclosure is not limited to any particular form of combination of software and hardware.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A method used in a user equipment that supports Device to Device transmission in Time Division Duplex system, comprising:
receiving, by the user equipment, a downlink signaling to obtain a first configured frame structure, or determining, by the user equipment, the first configured frame structure by itself; and
transmitting, by the user equipment, a first D2D signaling to indicate the first configured frame structure;
wherein the first configured frame structure is one of TDD UL/DL frame structure #{0,1,2,3,4,5,6} of a service cell associated with the user equipment, or the first configured frame structure is configured as uplink frame structure.

2. The method in claim 1, further comprises:
receiving a second D2D signaling to obtain a second configured frame structure.

3. The method in claim 1, comprises:
receiving D2D signals in a subframe corresponding to an uplink subframe of the first configured frame structure.

4. The method in claim 2, comprises:
selecting a suitable subframe out of the subframes corresponding to the UL subframe of the second configured frame structure; and
transmitting D2D signals on the suitable subframe.

5. The method in claim 1, wherein the first D2D signaling is a physical layer signaling.

6. A method used in UE that supports D2D transmission under TDD system, comprising:
receiving, by the UE, a first D2D signaling to obtain a first configured frame structure;
wherein the first configured frame structure is one of TDD UL/DL frame structure #{0,1,2,3,4,5,6} of a service cell associated with a transmitter of the first D2D signaling, or the first configured frame structure is configured as uplink frame structure, and the first configured frame structure is determined by the transmitter of the first D2D signaling.

7. The method in claim 6, comprises:
selecting a suitable subframe out of the subframes corresponding to the UL subframe of the first configured frame structure; and
transmitting D2D signals on the suitable subframe.

8. The method in claim 6, wherein the first D2D signaling is a physical layer signaling.

9. A user equipment, comprising:
a first module for receiving a downlink signaling to obtain a first configured frame structure, or determining a first configured frame structure by itself; and
a second module for transmitting a first D2D signaling to indicate the first configured frame structure;
wherein the first configured frame structure is one of TDD UL/DL frame structure #{0,1,2,3,4,5,6} of a service cell associated with the user equipment, or the first configured frame structure is configured as uplink frame structure.

10. The equipment in claim 9, comprises:
a third module for receiving a second D2D signaling to obtain a second configured frame structure.

11. The equipment in claim 9, comprises:
a fourth module for receiving D2D signals in a subframe corresponding to the UL subframe of the first configured frame structure.

12. The equipment in claim 10, comprises:
a fifth module for selecting a suitable subframe out of the subframes corresponding to the UL subframe of the second configured frame structure; and
a sixth module for transmitting D2D signals on the suitable subframe.

* * * * *